US012475901B2

(12) United States Patent
Rämö et al.

(10) Patent No.: US 12,475,901 B2
(45) Date of Patent: Nov. 18, 2025

(54) QUANTISATION OF AUDIO PARAMETERS

(71) Applicant: NOKIA TECHNOLOGIES OY, Espoo (FI)

(72) Inventors: Anssi Rämö, Tampere (FI); Mikko-Ville Laitinen, Espoo (FI); Lasse Laaksonen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 210 days.

(21) Appl. No.: 18/247,923

(22) PCT Filed: Oct. 5, 2020

(86) PCT No.: PCT/FI2020/050657

§ 371 (c)(1),
(2) Date: Apr. 5, 2023

(87) PCT Pub. No.: WO2022/074283

PCT Pub. Date: Apr. 14, 2022

(65) Prior Publication Data

US 2023/0377587 A1 Nov. 23, 2023

(51) Int. Cl.

*G10L 19/008* (2013.01)
*H04S 3/00* (2006.01)
*H04S 7/00* (2006.01)

(52) U.S. Cl.

CPC ............ *G10L 19/008* (2013.01); *H04S 3/008* (2013.01); *H04S 7/307* (2013.01); *H04S 2400/01* (2013.01);

(Continued)

(58) Field of Classification Search

CPC ... G10L 19/008; G10L 19/032; G10L 19/035; H04S 3/008; H04S 7/307; H04S 7/30;

(Continued)

(56) References Cited

U.S. PATENT DOCUMENTS 10,873,814 B2 12/2020 Vilkamo et al.
2007/0016416 A1* 1/2007 Roden .................. G10L 19/008 704/E19.014

(Continued)

FOREIGN PATENT DOCUMENTS

EP 2712077 A1 3/2014
EP 2830047 A1 1/2015

(Continued)

OTHER PUBLICATIONS

Office Action for Canadian Application No. 3,194,906 dated Sep. 9, 2024, 3 pages.

(Continued)

*Primary Examiner* — Yogeshkumar Patel
(74) *Attorney, Agent, or Firm* — ALSTON & BIRD LLP

(57) ABSTRACT

There is inter alia disclosed an apparatus for audio encoding configured to compare an audio parameter against a threshold value and against a value dependent on a previous quantized audio parameter; calculate a quantized audio parameter as the previous quantized audio parameter increased by a predetermined value; and calculate the quantized audio parameter as the previous quantized audio parameter multiplied by a factor value.

20 Claims, 7 Drawing Sheets

(52) U.S. Cl.
CPC ....... *H04S 2400/11* (2013.01); *H04S 2420/03* (2013.01); *H04S 2420/11* (2013.01)

(58) Field of Classification Search
CPC ............. H04S 2400/01; H04S 2400/11; H04S 2420/03; H04S 2420/11; H04S 2400/15
See application file for complete search history.

(56) References Cited

U.S. PATENT DOCUMENTS

| | | | | |
|---|---|---|---|---|
| 2011/0235810 | A1* | 9/2011 | Neusinger | G10L 19/26 381/23 |
| 2012/0128174 | A1 | 5/2012 | Tammi et al. | |
| 2013/0044884 | A1 | 2/2013 | Tammi et al. | |
| 2014/0236583 | A1* | 8/2014 | Rajendran | G10L 19/005 704/219 |
| 2015/0154966 | A1* | 6/2015 | Bharitkar | G10L 19/008 381/23 |
| 2020/0265851 | A1* | 8/2020 | Fuchs | G10L 19/032 |
| 2021/0250717 | A1* | 8/2021 | Laitinen | H04S 3/008 |

FOREIGN PATENT DOCUMENTS

| | | | |
|---|---|---|---|
| EP | 2881945 | A1 | 6/2015 |
| GB | 2574667 | A | 12/2019 |
| WO | WO 2017/005978 | A1 | 1/2017 |
| WO | WO 2019/239011 | A1 | 12/2019 |
| WO | WO 2021/058856 | A1 | 4/2021 |

OTHER PUBLICATIONS

Extended European Search Report for European Application No. 20956626.4 dated Mar. 6, 2024, 5 pages.

International Search Report and Written Opinion for Patent Cooperation Treaty Application No. PCT/FI2020/050657 dated May 28, 2021, 18 pages.

Murison, R., "Sigma-Delta Modulators—Part 1", Copper Magazine, No. 15, (Sep. 12, 2016), 42 pages.

Office Action for Indian Application No. 202317030716 dated Jan. 27, 2025, 6 pages.

* cited by examiner

QUANTISATION OF AUDIO PARAMETERS

CROSS-REFERENCE TO RELATED APPLICATIONS

This application is a national phase entry of International Application No. PCT/FI2020/050657, filed Oct. 5, 2020, the contents of which are hereby incorporated by reference in their entirety.

FIELD

The present application relates to apparatus and methods for quantisation of a low frequency audio channel but not exclusively for the quantisation of a low frequency audio within an audio encoder and decoder.

BACKGROUND

Typical loudspeaker layouts for multichannel reproduction (such as 5.1) include "normal" loudspeaker channels and low frequency effect (LFE) channels. The normal loudspeaker channels (i.e., the 5. part) contain wideband signals. Using these channels an audio engineer can for example position an auditory object to a desired direction. The LFE channels (i.e., the 0.1 part) contain only low-frequency signals (<120 Hz), and they are typically reproduced with a subwoofer. LFE was originally developed for reproducing separate low-frequency effects, but has also been used for routing part of the low-frequency energy of a sound field to a subwoofer.

All common multichannel loudspeaker layouts, such as 5.1, 7.1, 7.1+4, and 22.2, contain at least one LFE channel. Hence, it is desirable for any spatial-audio processing system with loudspeaker reproduction to utilize the LFE channel.

If the input to the system is a multichannel mix (e.g., 5.1), and the output is to multichannel loudspeaker setup (e.g., 5.1), the LFE channel does not need any specific processing, it can be directly routed to the output. However, the multichannel signals may be transmitted, and typically the audio signals require compression in order to have a reasonable bit rate.

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

SUMMARY

There is provided according to a first aspect an apparatus for encoding an audio parameter comprising: means for comparing the audio parameter against a threshold value and against a value dependent on a previous quantized audio parameter; means for calculating a quantized audio parameter as the previous quantized audio parameter increased by a predetermined value when the audio parameter is greater than the threshold value and greater than the value dependent on the previous quantized audio parameter; and means for calculating the quantized audio parameter as the previous quantized audio parameter multiplied by a factor value when the audio parameter is either less than the threshold value or less than the value dependent on the previous quantized audio parameter.

The apparatus may further comprise: means for encoding into a bitstream an indication that the audio parameter is greater than the threshold value and greater than the value dependent on the previous quantized audio parameter; and means for encoding into the bitstream an indication that the audio parameter is either less than the threshold value or less than the value dependent on the previous quantized audio parameter.

The apparatus may further comprises: means for determining that the previous quantised audio parameter has also been determined by being increased by the predetermined value; and the means for calculating the quantized audio parameter as the previous quantized audio parameter increased by the predetermined value when the audio parameter is greater than the threshold value and greater than the value dependent on the previous quantized audio parameter may comprise means for calculating the quantized audio parameter as the previous quantized audio parameter increased by the predetermined value multiplied by a gain factor when the audio parameter is greater than the threshold value and greater than the value dependent on the previous quantized audio parameter.

The gain factor may have an absolute value greater than 1.

The value dependent on the previous quantized audio parameter may comprise a combination of the previous quantized audio parameter increased by a predetermined value and the previous quantized audio parameter multiplied by a damping factor.

The damping factor may have an absolute value less than 1.

The audio parameter may be a spatial audio parameter.

The audio parameter may be a low frequency effect to total energy ratio.

According to a second aspect there is an apparatus for decoding an audio parameter comprising: means for decoding from a bitstream an indication; means for calculating a quantized audio parameter as a previous quantized audio parameter increased by a predetermined value when the indicator indicates that the audio parameter is greater than a threshold value and greater than a value dependent on the previous quantized audio parameter; and means for calculating the quantized audio parameter as the previous quantized audio parameter multiplied by a factor value when the indicator indicates that the audio parameter is either less than the threshold value or less than the value dependent on the previous quantized audio parameter.

The apparatus may further comprise: means for decoding from the bitstream an indication relating to a previous audio parameter; means for determining that the indication relating to the previous audio parameter indicates that the quantised previous audio parameter has also been determined by being increased by the predetermined value; and the means for calculating the quantized audio parameter as the previous quantized audio parameter increased by the predetermined value when the audio parameter is greater than the threshold value and greater than the value dependent on the previous quantized parameter may comprise means for calculating the quantized audio parameter as the previous quantized audio parameter increased by the predetermined value multiplied by a gain factor when the audio parameter is greater than the threshold value and greater than the value dependent on the previous quantized audio parameter.

The gain factor may have an absolute value greater than 1.

The value dependent on the previous quantized audio parameter may comprises a combination of the previous quantized audio parameter increased by a predetermined value and the previous quantized audio parameter multiplied by a damping factor.

The damping factor may have an absolute value less than 1.

The audio parameter may be a spatial audio parameter.

The audio parameter may be a low frequency effect to total energy ratio.

According to a third aspect there is a method for encoding an audio parameter comprising: comparing the audio parameter against a threshold value and against a value dependent on a previous quantized audio parameter; calculating a quantized audio parameter as the previous quantized audio parameter increased by a predetermined value when the audio parameter is greater than the threshold value and greater than the value dependent on the previous quantized audio parameter; and calculating the quantized audio parameter as the previous quantized audio parameter multiplied by a factor value when the audio parameter is either less than the threshold value or less than the value dependent on the previous quantized audio parameter.

The method may further comprise: encoding into a bitstream an indication that the audio parameter is greater than the threshold value and greater than the value dependent on the previous quantized audio parameter; and encoding into the bitstream an indication that the audio parameter is either less than the threshold value or less than the value dependent on the previous quantized audio parameter.

The method further may comprise: determining that the previous quantised audio parameter has also been determined by being increased by the predetermined value; and the calculating the quantized audio parameter as the previous quantized audio parameter increased by the predetermined value when the audio parameter is greater than the threshold value and greater than the value dependent on the previous quantized audio parameter may comprise calculating the quantized audio parameter as the previous quantized audio parameter increased by the predetermined value multiplied by a gain factor when the audio parameter is greater than the threshold value and greater than the value dependent on the previous quantized audio parameter.

The gain factor has an absolute value greater than 1.

The value dependent on the previous quantized audio parameter may comprise a combination of the previous quantized audio parameter increased by a predetermined value and the previous quantized audio parameter multiplied by a damping factor.

The damping factor may have an absolute value less than 1.

The audio parameter may be a spatial audio parameter.

The audio parameter may be a low frequency effect to total energy ratio.

There is according to a fourth aspect a method for decoding an audio parameter comprising: decoding from a bitstream an indication; calculating a quantized audio parameter as a previous quantized audio parameter increased by a predetermined value when the indicator indicates that the audio parameter is greater than a threshold value and greater than a value dependent on the previous quantized audio parameter; and calculating the quantized audio parameter as the previous quantized audio parameter multiplied by a factor value when the indicator indicates that the audio parameter is either less than the threshold value or less than the value dependent on the previous quantized audio parameter.

The method may further comprise: decoding from the bitstream an indication relating to a previous audio parameter; determining that the indication relating to the previous audio parameter indicates that the quantised previous audio parameter has also been determined by being increased by the predetermined value; and the means for calculating the quantized audio parameter as the previous quantized audio parameter increased by the predetermined value when the audio parameter is greater than the threshold value and greater than the value dependent on the previous quantized parameter may comprise means for calculating the quantized audio parameter as the previous quantized audio parameter increased by the predetermined value multiplied by a gain factor when the audio parameter is greater than the threshold value and greater than the value dependent on the previous quantized audio parameter.

The gain factor may have an absolute value greater than 1.

The value dependent on the previous quantized audio parameter may comprise a combination of the previous quantized audio parameter increased by a predetermined value and the previous quantized audio parameter multiplied by a damping factor.

The damping factor may have an absolute value less than 1.

The audio parameter may be a spatial audio parameter.

The audio parameter may be a low frequency effect to total energy ratio.

According to a fifth aspect there is provided an apparatus for encoding an audio parameter comprising at least one processor and at least one memory including computer program code, the at least one memory and the computer program code configured to, with the at least one processor, cause the apparatus to at least to perform: comparing the audio parameter against a threshold value and against a value dependent on a previous quantized audio parameter; calculating a quantized audio parameter as the previous quantized audio parameter increased by a predetermined value when the audio parameter is greater than the threshold value and greater than the value dependent on the previous quantized audio parameter; and calculating the quantized audio parameter as the previous quantized audio parameter multiplied by a factor value when the audio parameter is either less than the threshold value or less than the value dependent on the previous quantized audio parameter.

According to a sixth aspect there is provided an apparatus for decoding an audio parameter comprising at least one processor and at least one memory including computer program code, the at least one memory and the computer program code configured to, with the at least one processor, cause the apparatus to at least to perform decoding from a bitstream an indication; calculating a quantized audio parameter as a previous quantized audio parameter increased by a predetermined value when the indicator indicates that the audio parameter is greater than a threshold value and greater than a value dependent on the previous quantized audio parameter; and calculating the quantized audio parameter as the previous quantized audio parameter multiplied by a factor value when the indicator indicates that the audio parameter is either less than the threshold value or less than the value dependent on the previous quantized audio parameter.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
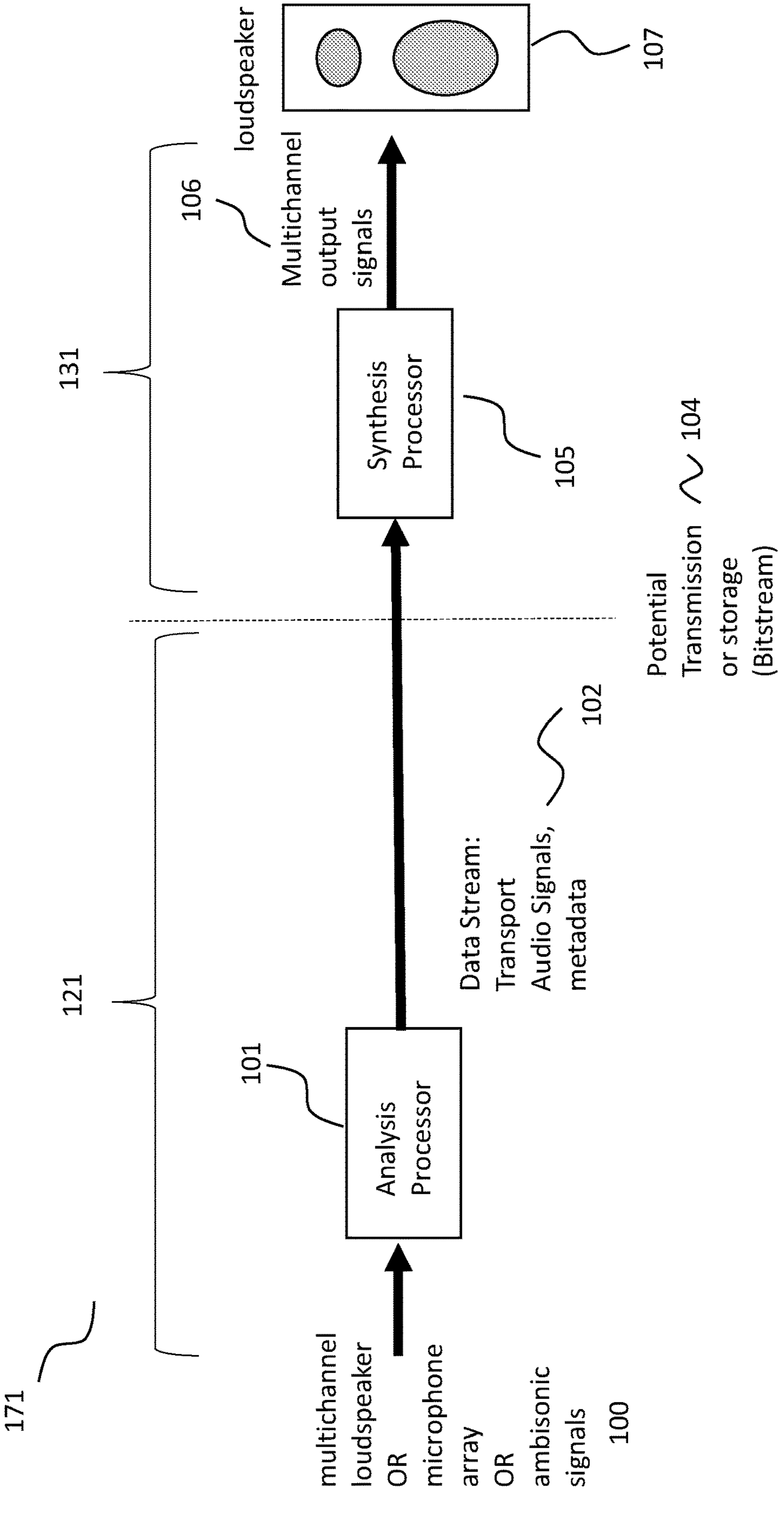
FIG. 1 shows schematically a system of apparatus suitable for implementing some embodiments.

The following describes in further detail suitable apparatus and possible mechanisms for the provision of effective spatial analysis derived metadata parameters for microphone array and other input format audio signals.

Apparatus have been designed to transmit a spatial audio modelling of a sound field using N (which is typically 2 or in some instances N can be a single channel) transport audio signals and spatial metadata. The transport audio signals are typically compressed with a suitable audio encoding scheme (for example advanced audio coding—AAC or enhanced voice services—EVS codecs). The spatial metadata may contain parameters such as Direction (for example azimuth, elevation) in time-frequency domain, and Direct-to-total energy ratio (or energy or ratio parameters) in time-frequency domain.

This kind of parametrization may be denoted as sound-field related parametrization in the following disclosure. Using the direction and the direct-to-total energy ratio may be denoted as direction-ratio parameterization in the following disclosure. Further parameters may be used instead/in addition to these (e.g., diffuseness instead of direct-to-total-energy ratio or adding a distance parameter to the direction parameter). Using such sound-field related parametrization, a spatial perception similar to that which would occur in the original sound field may be reproduced. As a result, the listener can perceive the multitude of sources, their directions and distances, as well as properties of the surrounding physical space, among the other spatial sound features.

The following disclosure proposes methods as how to convey LFE information alongside with the (direction and ratio) spatial parametrization. Thus, for example in the case of multichannel loudspeaker input, the embodiments aim to faithfully reproduce the perception of the original LFE signal. In some embodiments in the case of microphone-array or Ambisonics input, apparatus and methods propose to determine a reasonable LFE related signal.

As the direction and direct-to-total energy ratio parametrization (in other words the direction-ratio parametrization) relates to the human perception of a sound field it aims to convey information that can be used to reproduce a sound field that is perceived equally as the original sound field. The parametrization is generic of the reproduction system in that it may be designed to adapt to loudspeaker reproduction with any loudspeaker setup and also headphone reproduction. Hence, such parametrization is useful with versatile audio codecs where the input can be from various sources (microphone-arrays, multichannel loudspeaker, Ambisonics) and the output can be to various reproduction systems (headphones, various loudspeaker setups).

However, as direction-ratio parametrization is independent of the reproduction system, it also means that there is no direct control of what audio should be reproduced from a certain loudspeaker. The direction-ratio parametrization determines directional distribution of the sound to be reproduced, which is typically enough for the broadband loudspeakers. But, LFE channel typically does not have any "direction". Instead, it is simply a channel where the audio engineer has decided to put a certain amount of low-frequency energy (and/or a certain low-frequency signal).

In the following embodiments the LFE information may be generated. In the embodiments involving a multichannel input (e.g., 5.1), the LFE channel information may be readily available. However, in some embodiments, for example microphone-array input, there is no LFE channel information (as microphones are capturing a real sound scene). Hence, the LFE channel information in some embodiments is generated or synthesized (in addition to encoding and transmitting this information).

The embodiments where the generation or synthesis of LFE is implemented enable a rendering system to avoid only using broadband loudspeakers to reproduce low frequencies and enable the use of a subwoofer or similar output device. Also the embodiments may allow the rendering or synthesis system to avoid the reproduction using a fixed energy portion of the low frequencies with the LFE speaker which may lose all directionality at those frequencies as there is typically only one LFE speaker. Whereas, with the embodiments as described herein, the LFE signal (which does not have directionality) can be reproduced with the LFE speaker, and other parts of the signal (which may have directionality) can be reproduced with the broadband speakers, thus maintaining the directionality.

Similar observations are valid also for other inputs such as Ambisonics input.

The concepts as expressed in the embodiments hereafter relate to audio encoding and decoding using a sound-field related parameterization (e.g., direction(s) and direct-to-total energy ratio(s) in frequency bands) where embodiments transmit (generated or received) low-frequency effects (LFE) channel information in addition to (broadband) audio signals with such parametrization. In some embodiments the transmission of the LFE channel (and broadband audio signals) information may be implemented by obtaining audio signals; computing the ratio of LFE energy and total energy of the audio signals in one or more frequency bands; determining direction parameters, energy ratio parameters 110 (comprising a direct-to-total energy ratio per direction and a diffuse-to-total energy ratio) and coherence parameters 112 using the audio signals; Quantizing and transmitting these LFE-to-total energy ratio(s) (in other words the LFE metadata) alongside associated audio signal(s) and direction and direct-to-total energy ratio parameters. Furthermore in such embodiments the audio may be synthesized for the LFE channel using the LFE-to-total energy ratio(s) and the associated audio signal(s); and synthesizing the audio for the other channels using the LFE-to-total energy ratio(s) (LFE metadata), direction, direct-to-total energy ratio and coherence parameters, and associated audio signal(s).

The embodiments as disclosed herein furthermore present apparatus and methods for quantising the LFE-to-total energy ratios associated with the LFE channel using a low bitrate representation. This enables the LFE channel to be transmitted with encoded multichannel audio signals operating at relatively low bit rates. For example, multichannel audio coding systems operating at an overall bit rate of about 13 kb/s may require the LFE channel to be quantised within the range of 50-200 b/s.

In some embodiments the input audio signals to the system may be multichannel audio signals, microphone array signals, or Ambisonic audio signals.

The transmitted associated audio signals (1–N, for example 2 audio signals) may be obtained by any suitable means for example by downmixing, selecting, or processing the input audio signals.

The direction and direct-to-total energy ratio parameters may be determined using any suitable method or apparatus.

As discussed above in some embodiments where the input is a multichannel audio input, the LFE energy and the total energy can be estimated directly from the multichannel signals. However in some embodiments apparatus and methods are disclosed for determining LFE-to-total energy ratio(s) which may be used to generate suitable LFE information in the situations where LFE channel information is not received, for example microphone array or Ambisonics input. This may therefore be based on the analysed direct-to-total energy ratio: if the sound is directional, small LFE-to-total energy ratio; and if the sound is non-directional, large LFE-to-total energy ratio.

In some embodiments apparatus and methods are presented for transmitting the LFE information from multichannel signals alongside Ambisonic signals. This is based on the methods discussed in detail hereafter where transmission is performed alongside the sound-field related parameterization and associated audio signals, but in this case spatial aspects are transmitted using the Ambisonic signals, and the LFE information is transmitted using the LFE-to-total energy ratio.

Furthermore in some embodiments apparatus and methods are presented for transcoding a first data stream (audio and metadata), where metadata does not contain LFE-to-total energy ratio(s), to second data stream (audio and metadata), where synthesized LFE-to-total energy ratio(s) are injected to the metadata.

With respect to FIG. 1 an example apparatus and system for implementing embodiments of the application are shown. The system 171 is shown with an 'analysis' part 121 and a 'synthesis' part 131. The 'analysis' part 121 is the part from receiving the input (multichannel loudspeaker, microphone array, ambisonics) audio signals 100 up to an encoding of the metadata and transport signal 102 which may be transmitted or stored 104. The 'synthesis' part 131 may be the part from a decoding of the encoded metadata and transport signal 104 to the presentation of the re-generated signal (for example in multi-channel loudspeaker form 106 via loudspeakers 107.

The input to the system 171 and the 'analysis' part 121 is therefore audio signals 100. These may be suitable input multichannel loudspeaker audio signals, microphone array audio signals, or ambisonic audio signals.

The input audio signals 100 may be passed to an analysis processor 101. The analysis processor 101 may be configured to receive the input audio signals and generate a suitable data stream 104 comprising suitable transport signals. The transport audio signals may also be known as associated audio signals and be based on the audio signals. For example, in some embodiments the transport signal generator 301 is configured to downmix or otherwise select or combine, for example, by beamforming techniques the input audio signals to a determined number of channels and output these as transport signals. In some embodiments the analysis processor is configured to generate a 2 audio channel output of the microphone array audio signals. The determined number of channels may be two or any suitable number of channels.

In some embodiments the analysis processor is configured to pass the received input audio signals 100 unprocessed to an encoder in the same manner as the transport signals. In some embodiments the analysis processor 101 is configured to select one or more of the microphone audio signals and output the selection for transmission or storage 104. In some embodiments the analysis processor 101 is configured to apply any suitable encoding or quantization to the transport audio signals.

In some embodiments the analysis processor 101 is also configured to analyse the input audio signals 100 to produce metadata associated with the input audio signals (and thus associated with the transport signals). The analysis processor 101 can, for example, be a computer (running suitable software stored on memory and on at least one processor), mobile device, or alternatively a specific device utilizing, for example, FPGAs or ASICs. As shown herein in further detail the metadata may comprise, for each time-frequency analysis interval, a direction parameter, an energy ratio parameter and a low frequency effect channel parameter (and furthermore in some embodiments a surrounding coherence parameter, and a spread coherence parameter and other parameters). The direction parameter and the energy ratio parameters may in some embodiments be considered to be spatial audio parameters. In other words, the spatial audio parameters comprise parameters which aim to characterize the sound-field of the input audio signals.

The analysis processor 101 in some embodiments comprises a time-frequency domain transformer.

In some embodiments the time-frequency domain transformer is configured to receive the input multi-channel signals and apply a suitable time to frequency domain transform such as a Short Time Fourier Transform (STFT) in order to convert the input time domain signals into a suitable time-frequency signals. These time-frequency signals may be passed to a spatial analyser 303.

Thus, for example, the time-frequency signals may be represented in the time-frequency domain representation by $$s_i(b, n),$$

where b is the frequency bin index and n is the time-frequency block (frame) index and i is the channel index. In another expression, n can be considered as a time index with a lower sampling rate than that of the original time-domain signals. These frequency bins can be grouped into sub bands that group one or more of the bins into a sub band of a band index k=0, . . . , K−1. Each sub band k has a lowest bin $b_{k,low}$ and a highest bin $b_{k,high}$, and the subband contains all bins from $b_{k,low}$ to $b_{k,high}$. The widths of the sub bands can approximate any suitable distribution. For example, the Equivalent rectangular bandwidth (ERB) scale or the Bark scale.

A time frequency (TF) tile (or block) is thus a specific sub band within a subframe of the frame.

It can be appreciated that the number of bits required to represent the spatial audio parameters may be dependent at least in part on the TF (time-frequency) tile resolution (i.e., the number of TF subframes or tiles). For example, a 20 ms audio frame may be divided into 4 time-domain subframes of 5 ms a piece, and each time-domain subframe may have up to 24 frequency subbands divided in the frequency domain according to a Bark scale, an approximation of it, or any other suitable division. In this particular example the audio frame may be divided into 96 TF subframes/tiles, in other words 4 time-domain subframes with 24 frequency subbands. Therefore, the number of bits required to represent the spatial audio parameters for an audio frame can be dependent on the TF tile resolution.

In some embodiments the parameters generated may differ from frequency band to frequency band and may be particularly dependent on the transmission bit rate. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons.

The transport signals and the metadata 102 may be transmitted or stored, this is shown in FIG. 1 by the dashed line 104. Before the transport signals and the metadata are transmitted or stored, they may in some embodiments be coded in order to reduce bit rate, and multiplexed to one stream. The encoding and the multiplexing may be implemented using any suitable scheme.

In the decoder side 131, the received or retrieved data (stream) may be input to a synthesis processor 105. The synthesis processor 105 may be configured to demultiplex the data (stream) to coded transport and metadata. The synthesis processor 105 may then decode any encoded streams in order to obtain the transport signals and the metadata.

The synthesis processor 105 may then be configured to receive the transport signals and the metadata and create a suitable multi-channel audio signal output 106 (which may be any suitable output format such as binaural, multi-channel loudspeaker or Ambisonics signals, depending on the use case) based on the transport signals and the metadata. In some embodiments with loudspeaker reproduction, an actual physical sound field is reproduced (using the loudspeakers 107) having the desired perceptual properties. In other embodiments, the reproduction of a sound field may be understood to refer to reproducing perceptual properties of a sound field by other means than reproducing an actual physical sound field in a space. For example, the desired perceptual properties of a sound field can be reproduced over headphones using the binaural reproduction methods as described herein. In another example, the perceptual properties of a sound field could be reproduced as an Ambisonic output signal, and these Ambisonic signals can be reproduced with Ambisonic decoding methods to provide for example a binaural output with the desired perceptual properties.

The synthesis processor 105 can in some embodiments be a computer (running suitable software stored on memory and on at least one processor), mobile device, or alternatively a specific device utilizing, for example, FPGAs or ASICs.

Figure 2:
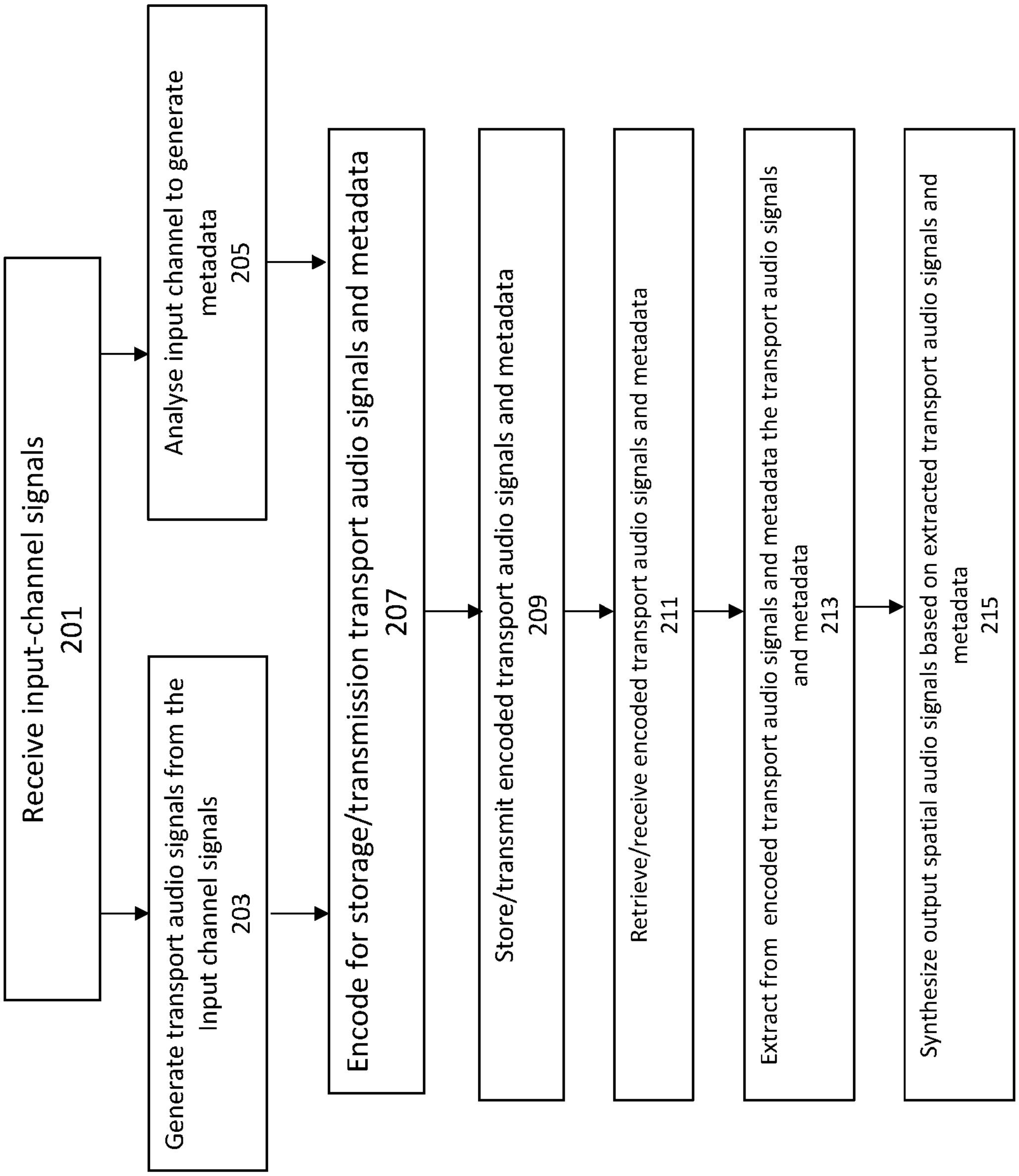
FIG. 2 shows a flow diagram of the operation of the system as shown in FIG. 1 according to some embodiments.

With respect to FIG. 2 an example flow diagram of the overview shown in FIG. 1 is shown.

First the system (analysis part) is configured to receive input audio signals or suitable multichannel input as shown in FIG. 2 by step 201.

Then the system (analysis part) is configured to generate a transport signal channels or transport signals (for example downmix/selection/beamforming based on the multichannel input audio signals) as shown in FIG. 2 by step 203.

Also the system (analysis part) is configured to analyse the audio signals to generate metadata: Directions; Energy ratios, LFE ratios (and in some embodiments other metadata such as Surrounding coherences; Spread coherences) as shown in FIG. 2 by step 205.

The system is then configured to (optionally) encode for storage/transmission the transport signals and metadata with coherence parameters as shown in FIG. 2 by step 207.

After this the system may store/transmit the transport signals and metadata (which may include coherence parameters) as shown in FIG. 2 by step 209.

The system may retrieve/receive the transport signals and metadata as shown in FIG. 2 by step 211.

Then the system is configured to extract from the transport signals and metadata as shown in FIG. 2 by step 213.

The system (synthesis part) is configured to synthesize an output spatial audio signals (which as discussed earlier may be any suitable output format such as binaural, multi-channel loudspeaker or Ambisonics signals, depending on the use case) based on extracted audio signals and metadata as shown in FIG. 2 by step 215.

Figure 3:
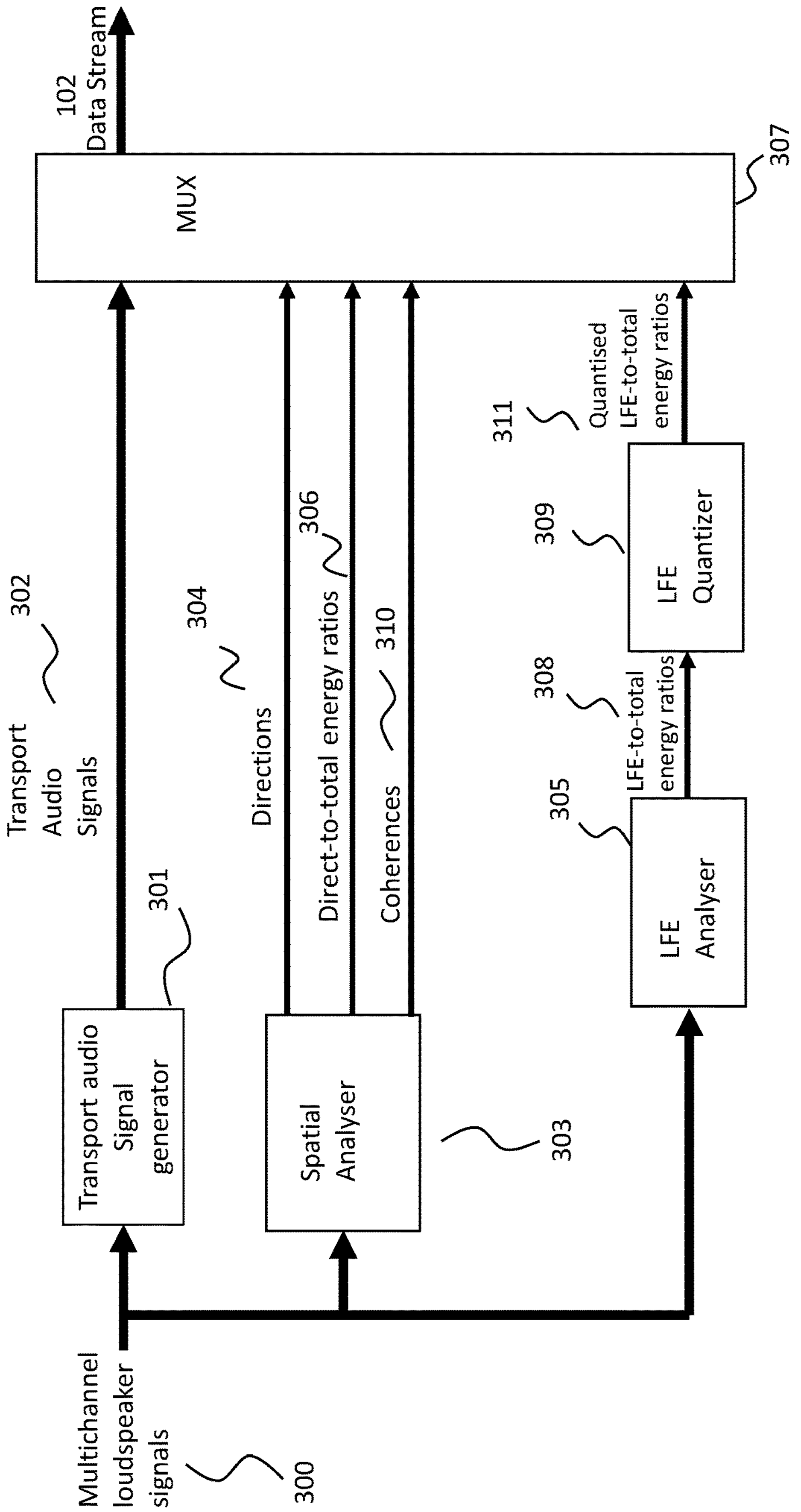
FIG. 3 shows schematically capture/encoding apparatus suitable for implementing some embodiments.

With respect to FIG. 3 an example analysis processor 101 according to some embodiments where the input audio signal is a multichannel loudspeaker input is shown. The multichannel loudspeaker signals 300 in this example are passed to a transport audio signal generator 301. The transport audio signal generator 301 is configured to generate the transport audio signals according to any of the options described previously. For example the transport audio signals may be downmixed from the input signals. The number of the transport audio signals may be any number and may be 2 or more or fewer than 2.

In the example shown in FIG. 3 the multichannel loudspeaker signals 300 are also input to a spatial analyser 303. The spatial analyser 303 may be configured to generate suitable spatial metadata outputs such as shown as the directions 304 and direct-to-total energy ratios 306. The implementation of the analysis may be any suitable implementation and, as long as it can provide direction for example azimuth θ(k, n) and direct-to-total energy ratio r(k, n) in a time-frequency domain (k is the frequency band index and n the temporal frame index).

For example, in some embodiments the spatial analyser 303 transforms the multi-channel loudspeaker signals to a first-order Ambisonics (FOA) signal and the direction and ratio estimation is performed in the time-frequency domain.

A FOA signal consists of four signals: The omnidirectional w(t), and three figure-of-eight patterns x(t), y(t) and z(t), aligned orthogonally. Let us assume them in a time-frequency transformed form: w(k,n), x(k,n), y(k,n), z(k,n).

SN3D normalization scheme is used, where the maximum directional response for each of the patterns is 1.

From the FOA signal, it is possible to estimate a vector that points towards the direction-of-arrival $$v_\theta(k,n) = \left\langle w(k,n)\begin{bmatrix} x(k,n) \\ y(k,n) \\ z(k,n) \end{bmatrix}\right\rangle.$$

The direction of this vector is the direction θ(k, n). The brackets ⟨.⟩ denote potential averaging over time and/or frequency. Note that when averaged, the direction data may not need to be expressed or stored for every time and frequency sample.

A ratio parameter can be obtained by $$r(k,n) = \frac{|v_\theta(k,n)|}{\langle 0.5(w^2(k,n) + x^2(k,n) + y^2(k,n) + z^2(k,n))\rangle}.$$

To utilize the above formulas for the loudspeaker input, then the loudspeaker signals $s_i(t)$ where i is the channel index can be transformed into the FOA signals by $$FOA_i(T) = \begin{bmatrix} w_i(t) \\ x_i(t) \\ y_i(t) \\ z_i(t) \end{bmatrix} = s_i(t)\begin{bmatrix} 1 \\ \cos(azi_i)\cos(ele_i) \\ \sin(azi_i)\cos(ele_i) \\ \sin(ele_i) \end{bmatrix}$$

The w, x, y, and z signals are generated for each loudspeaker signal $s_i$ having its own azimuth and elevation direction. The output signal combining all such signals is $\Sigma_{i=1}^{NUM\_CH} FOA_i(t)$.

The multichannel loudspeaker signals 300 may also be input to an LFE analyser 305. The LFE analyser 305 may be configured to generate LFE-to-total energy ratios 308 (which may also be known generally as low or lower frequency effects to total energy ratios).

The output from the LFE analyser 305 may be passed to an LFE Quantizer 309 in order that the LFE-to-total energy ratios 308 may be quantized to provide quantised LFE-to-total energy ratios 311.

The spatial analyser may further comprise a multiplexer 307 configured to combine and encode the transport audio signals 302, the directions 304, the direct-to-total energy ratios 306, coherences 310 and quantised LFE-to-total energy ratios 311 to generate the data stream 102. The multiplexer 307 may be configured to compress the audio signals using a suitable codec (e.g., AAC or EVS) and furthermore compress the metadata as described above.

Figure 4:
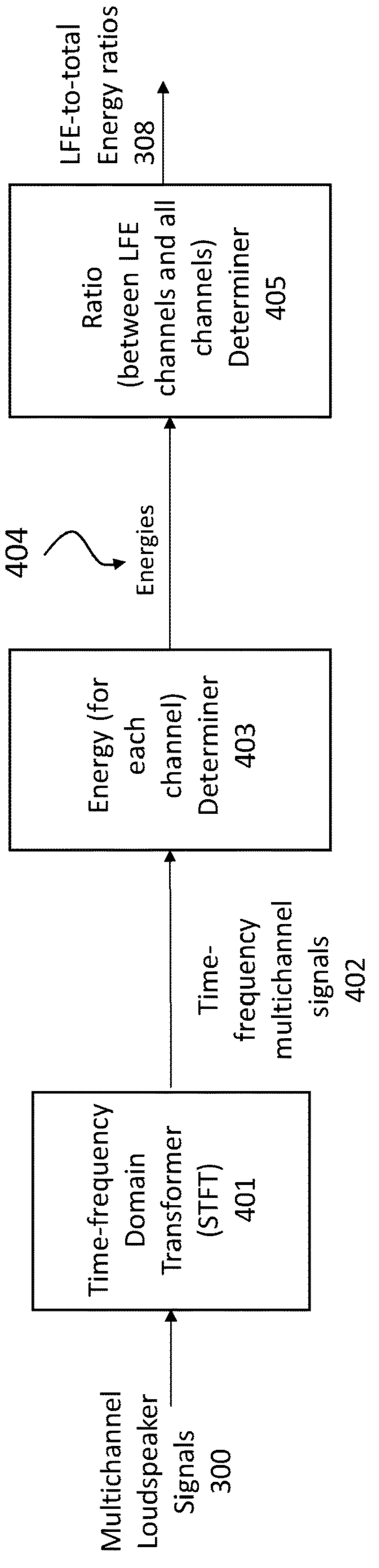
FIG. 4 shows schematically low frequency effect channel analyser apparatus as shown in FIG. 3 suitable for implementing some embodiments.

With respect to FIG. 4 is shown the example LFE analyser 305 as shown previously in FIG. 3.

The example LFE analyser 305 may comprise a time-frequency transformer 401 configured to receive the multi-channel loudspeaker signals and transform the multichannel loudspeaker signals to the time-frequency domain, using a suitable transform (for example a short-time Fourier transform (STFT), complex-modulated quadrature mirror filterbank (QMF), or hybrid QMF that is the complex QMF bank with cascaded band-division filters at the lowest frequency bands to improve the frequency resolution). The resulting signals may be denoted as $S_i(b, n)$, where i is the loudspeaker channel, b the frequency bin index, and n temporal frame index.

In some embodiments the LFE analyser 305 may comprise an energy (for each channel) determiner 403 configured to receive the time-frequency audio signals and determine an energy of each channel by $$E_i(b,n) = S_i(b,n)^2$$

The energies of the frequency bins may be grouped into frequency bands that group one or more of the bins into a band index k=0, . . . , K−1

$$E_i(k,n) = \sum_{b_{k,low}}^{b_{k,high}} E_i(b,n)$$

Each frequency band k has a lowest bin $b_{k,low}$ and a highest bin $b_{k,high}$, and the frequency band contains all bins from $b_{k,low}$ to $b_{k,high}$. The widths of the frequency bands can approximate any suitable distribution. For example, the equivalent rectangular bandwidth (ERB) scale or the Bark scale are typically used in spatial-audio processing.

In some embodiments the LFE analyser 305 may comprise a ratio (between LFE channels and all channels) determiner 405 configured to receive the energies 404 from the energy determiner 403. The ratio (between LFE channels and all channels) determiner 405 may be configured to determine the LFE-to-total energy ratio by selecting the frequency bands at low frequencies in a way that the perception of LFE is preserved. For example in some embodiments two bands may be selected at low frequencies (0-60 and 60-120 Hz), or, if minimal bitrate is desired, only one band may be used (0-120 Hz). In some embodiments a larger number of bands may be used, the frequency borders of the bands may be different or may overlap partially. Furthermore, in some embodiments the energy estimates may be averaged over the time axis.

The LFE-to-total energy ratio Ξ(k, n) may then be computed as the ratio of the sum of the energies of the LFE channels and the sum of the energies all channels, for example by using the following calculation:

$$\Xi(k,n) = \frac{\sum_{i \in LFE} E_i(k,n)}{\sum_i E_i(k,n)}$$

The LFE-to-total energy ratios Ξ(k, n) 308 may then be output and passed to the LFE quantiser 309. Sometimes the LFE signals may be downmixed with a subset of channels. In this instance the above expression would be written in terms of the ratio of the sum of the energies of the LFE channels and the sum of the energies of the subset of channels In embodiments the LFE quantiser 309 may be arranged to have a multi-quantizer approach whereby a particular quantizer may be used to quantise the LFE-to-total energy ratios according to the operating bit rate of the LFE channel and the results of an analysis performed on the LFE-to-total energy ratios themselves.

For instance, the LFE quantiser 309 may be arranged to have the following functionality:

a determine maximum LFE-to-total energy ratio for the frame, bearing in mind each frame may be divided into a number of TF tiles. That is the maximum LFE-to-total energy ratio for all the LFE-to-total energy ratios in the frame, whereby every TF tile (k, n) in the frame may have a calculated LFE-to-total energy ratio Ξ(k, n).

if the determined maximum LFE-to-total energy ratio for the frame is below a pre-determined threshold, then send a one bit (for the frame) indicating that there are no quantised LFE-to-total energy ratios for the frame.

if the determined maximum LFE-to-total energy ratio for the frame is above a pre-determined threshold, then determine an average LFE-to-total energy ratio for the over the TF tiles of the frame.

depending on the encoding bitrate, quantize and send the average LFE-to-total energy ratio using one of a number of bit rates. For instance the average LFE-to-total energy ratio may be scalar quantised according to a number of different rates. A vector quantizer (VQ) based on the quantized average LFE-to-total energy ratio may then be selected from a group of vector quantizers (VQ). The selected vector quantizer may then be used to quantize the mean removed LFE-to-total energy ratio for each subframe.

Figure 5:
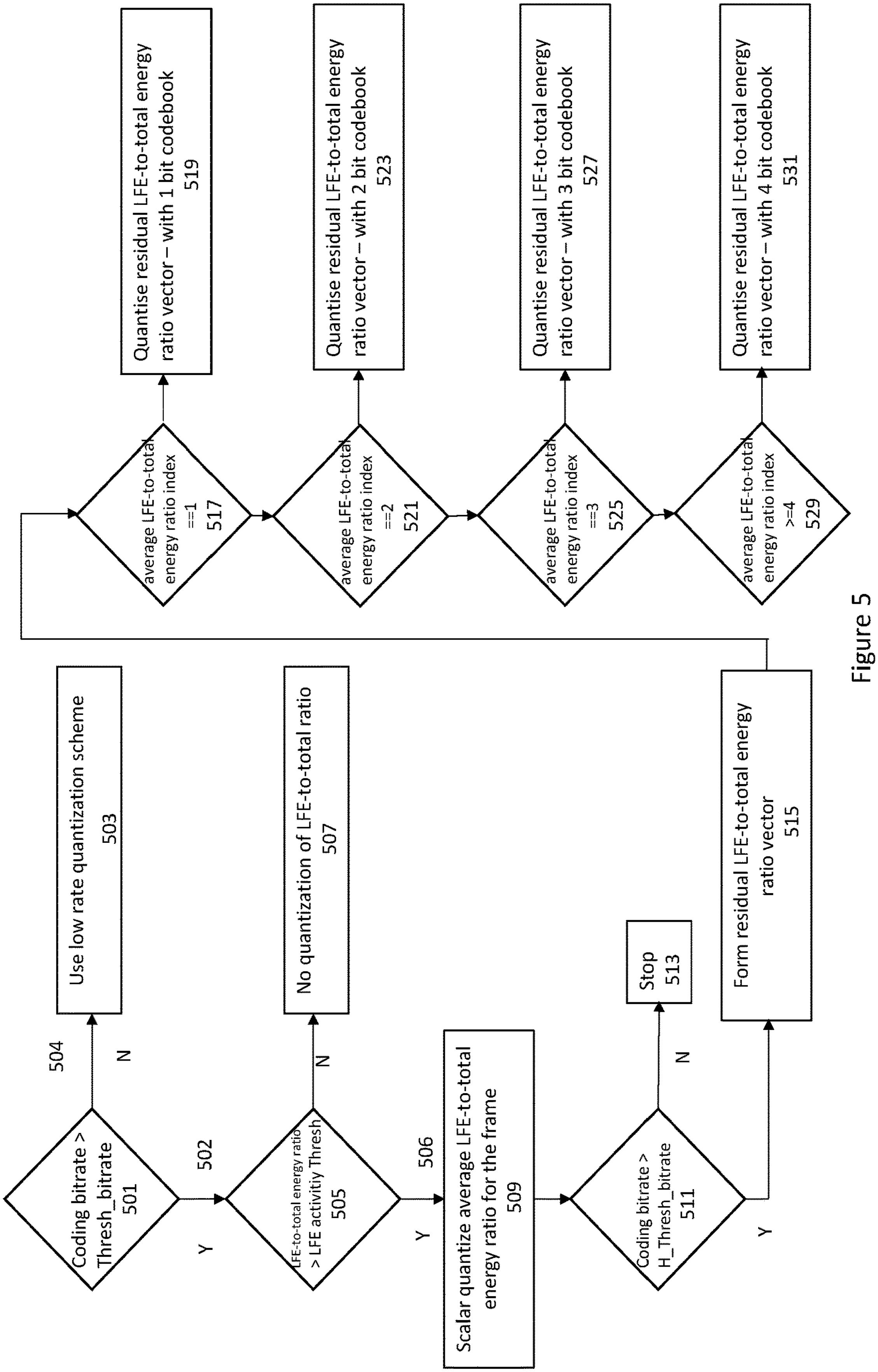
FIG. 5 shows a flow diagram of the operation of low frequency effect quantiser apparatus according to some embodiments.

FIG. 5 shows how the LFE quantiser 309 may be configured to have a LFE-to-total energy ratio quantizing scheme capable of quantizing the LFE-to-total energy ratio according to a number of different quantizing schemes. In this instance there is a LFE-to-total energy ratio quantizing scheme incorporating a decision loop which allows for either scalar or vector quantization of the LFE-to-total energy ratios in a frame.

FIG. 5 shows that initially a decision is made based on the encoding bitrate, where if the available encoding bit rate is above a threshold bitrate value (Thresh_bitrate) then a higher rate scheme for quantization of the LFE-to-total energy ratios for the frame may be selected. The higher rate scheme may be based on scalar or vector quantization or both. This decision path is depicted as 502 in FIG. 5. If, however the available encoding bit rate for the frame is less that the threshold bitrate value then a low rate quantization scheme based on tracking the amount of energy associated with the LFE channel with the aim of maintaining the perception of the original sound (within the LFE channel). This path is depicted as 504 in FIG. 5.

One solution to encoding the LFE-to-total energy ratios using a low rate quantization approach (according to 503 in FIG. 5) is to simply use a bit to signify if LFE-to-total energy ratio for the subframe or frame is above a predetermined threshold. This method may use 1 bit per subframe to signal/quantise the LFE-to-total energy ratio.

Another solution to encoding/quantising the LFE-to-total energy ratios at a low rate (according to 503 in FIG. 5) is to use a sigma-delta type approach whereby a single bit is used to modulate the value of the LFE-to-total energy ratio from one frame to the next (or one subframe to the next).

At the encoding side this may be achieved by comparing a current LFE-to-total energy ratio (a LFE-to-total energy ratio for a current frame or subframe) to a predetermined threshold together with a value derived from a previous quantised LFE-to-total energy ratio. The derived value may be a combination of one term which increases the previous (stored) quantised LFE-to-total energy ratio by a fixed amount (beta) and second term which adds a degree of hysteresis which smooths out any abrupt changes to current quantised LFE-to-total energy ratio. The second term may be formulated by multiplying the previous quantised LFE-to-total energy ratio by a dampening factor (alpha).

At the encoding side, when the current LFE-to-total energy ratio is greater than both the predetermined threshold together with the value derived from a previous quantised LFE-to-total energy ratio, the LFE Quantizer 309 may be arranged to increase the previous quantised LFE-to-total energy ratio by the fixed amount beta. This increased previous quantised LFE-to-total energy ratio becomes the quantised LFE-to-total energy ratio for the current frame, which is stored ready to be used as the previous quantised LFE-to-total energy ratio for the next frame. The increase (by the amount beta) applied to the previous quantised LFE-to-total energy ratio may be signalled by the state of a single bit. For instance, the state of "1" could signify an increase to the previous quantised LFE-to-total energy ratio.

Conversely at the encoding side, when either the current LFE-to-total energy ratio is less than (or equal to) either the predetermined threshold or the value derived from a previous quantised LFE-to-total energy ratio, then the LFE Quantizer 309 may be arranged not to increase the previous quantised LFE-to-total energy ratio by the fixed amount beta. In this case the previous quantised LFE-to-total energy ratio may be damped by a damping factor alpha. In other words the previous quantised LFE-to-total energy ratio for the next frame is the quantised LFE-to-total energy ratio for the current frame multiplied by the factor alpha. The effective decrease to the previous quantised LFE-to-total energy ratio (which forms the current quantised LFE-to-total energy ratio) can also be signalled by the state of the single bit. For instance, the state of "0" can signify a decrease to the previous quantised LFE-to-total energy ratio.

The above algorithm for quantizing the LFE-to-total energy ratio for a current frame at time instant t may be expressed by the pseudocode below:

```
Pseudocode:
/ / LFE_g(t) unquantized LFE-to-total energy ratio at time instant t
/ / LFE_q(t-1) quantized LFE-to-total energy ratio at time instant t-1
/ / (previous frame)
/ / LFE_t LFE-to-total energy ratio (minimum active) threshold (e.g. 0.02f)
/ / alpha time-delay-hysteris constant (dampening factor) (e.g. 0.67f)
/ / beta pump-up gain (e.g. 0.09f)
while (newframe)
   if (LFE_g(t) > LFE_t) && (LFE_g (t) > ( (beta+LFE_q(t-1) +alpha*LFE_q(t-1))/2)
      send ("1")
      LFEq (t-1) = beta + LFEq(t-1) //updating previous quantised LFE-to-total
            / /energy ratio for next time instant t+1
else
      send ("0")
      LFEq (t-1) =alpha*LFEq (t-1) //updating previous quantised LFE-to-total
            / /energy ratio for next time instant t+1
```

In further embodiments there may be a need to react faster to a change of LFE-to-total energy ratios on a frame by frame basis. This may be arranged by storing a previously taken decision of whether to increase or decrease the previous quantised LFE-to-total energy ratio for a previous frame. That is, in the case a decision to be taken at a current frame at time instance t, the aforementioned previous decision may refer to the decision taken for the frame at time instance t−1. The outcome of whether there should be need to react faster to a change of LFE-to-total energy ratios may then be based on whether both the previous update decision and current update decision both indicate that there should be an increase in the quantised LFE-to-total energy ratio.

In other words, if the previous update decision had signified that there was an increase in the quantised LFE-to-total energy ratio and the update decision for the current frame also signified an increase in the quantised LFE-to-total energy ratio. Then it may be determined that the quantised LFE-to-total energy ratio should be increased by a larger amount, such as an amount given by beta*theta, where theta is greater than 1.

In terms of the above pseudo code the conditions for an increased (rate of) change to the quantised LFE-to-total energy ratio result from the decision to send a "1" for the current frame together with the decision for the previous frame also to send a "1". This further embodiment may be reflected in the pseudocode as

```
Pseudocode:
/ / LFE_g(t) unquantized LFE-to-total energy ratio at time instant t
/ / LFE_q(t-1) quantized LFE-to-total energy ratio at time instant t-1
/ / LFE_t LFE-to-total energy ratio (minimum active) threshold (e.g. 0.02f)
/ / alpha time-delay-hysteris constant (dampening factor) (e.g. 0.67f)
/ / beta pump-up gain (e.g. 0.09f)
while (newframe)
  if (LFE_g (t) > LFE_t) & & (LFE_g (t) > ( (beta+LFE_q (t-1) +alpha*LFE_q (t-1) )/2)
    send ("1")
    if (previoussend ("1") )
      LFEq (t-1) = theta*beta + LFEq (t-1)//two consecutive 1s "11"
            / /updating previous quantised LFE-to-
          / /total energy ratio for next time instant
          / /t+1
    else
      LFEq (t-1) = beta + LFEq (t-1) //updating previous quantised LFE-to-
            //total energy ratio for next time instant
            / /t+1
  else
    send ("0")
    LFEq (t-1) =alpha*LFEq (t-1) //updating previous quantised LFE-to-total
                / /energy ratio for next time instance t+1
previoussend = send      / /store send for next time instance
```

Returning to FIG. 5, the path 502 may be taken if the available coding rate for the for the LFE-to-total energy ratio is greater than a threshold bitrate (Thresh_bitrate). The path 502 uses the higher rate quantization scheme which can be a combination of scalar and vector quantization to encode the LFE-to-total energy ratios for each subframe of the frame. Initially a LFE-to-total energy ratio for the subframe is checked against a LFE activity threshold (FIG. 5, 505). If this threshold is exceeded then the quantization process is entered for quantizing the LFE-to-total energy ratio for each (sub)frame (FIG. 5, 506). However, if the threshold is not exceeded then the LFE-to-total energy ratio for the whole frame is not quantised (FIG. 5, 507).

Upon entry into the quantization process for quantising the LFE-to-total energy ratio for each subframe (path 506, FIG. 5), the process may use a scalar quantizer in the log 2 domain to quantize the average LFE-to-total energy ratio for the frame. This is shown as processing block 509 in FIG. 5.

The process may then check that the available coding rate is above a higher threshold bitrate (H_Thresh_Bitrate, 511, FIG. 5). If the check at 511 indicates that the available coding rate (for the frame) is above the higher threshold bitrate, the quantisation of the LFE-to-total energy ratio for all subframes of the frame may enter into a further processing phase. The further processing phase may comprise forming a residual LFE-to-total energy ratio vector for each frame whereby each component of the vector is formed by subtracting the quantised average LFE-to-total energy ratio (formed in block 509) from the LFE-to-total energy ratio corresponding to each subframe in the frame. Also depicted in FIG. 5 is the processing block 513 which signifies that there is no further quantising when the available coding rate for the frame is below the higher threshold bitrate.

The LFE-to-total energy ratio vector may then be quantised using one of a number of different codebooks. The size of the codebook used to quantize the LFE-to-total energy ratio vector may be dependent on the size of the quantized average LFE-to-total energy ratio. Therefore, a LFE-to-total energy ratio vector derived from a low valued quantized average LFE-to-total energy ratio may use a smaller sized codebook to encode the LFE-to-total energy ratio vector, and a LFE-to-total energy ratio vector derived from a high valued quantized average LFE-to-total energy ratio may use a larger sized codebook to encode the LFE-to-total energy ratio vector. Processing block 515 depicts the step of forming the residual LFE-to-total energy ratio vector within FIG. 5.

With respect to FIG. 5, the process of selecting a codebook size according to the size of the quantized average LFE-to-total energy ratio is laid out according to a practical implementation. In this example, the index of the quantized average LFE-to-total energy ratio is used to select the codebook. The selected codebook is then used to quantise the LFE-to-total energy ratio vector. In this example, low value index 1 will correspond to the lowest quantized average LFE-to-total energy ratio which in turn leads to the selection of the smallest 1 bit codebook (depicted in FIG. 5 as processing blocks 517, 519). In contrast, however, a quantized average LFE-to-total energy ratio index of "4 and above" will correspond to a higher quantized average LFE-to-total energy ratio which in turn leads to the selection of the largest 4 bit codebook (depicted in FIG. 5 as processing blocks 529, 531). In between these two extremities are the processing blocks 521 and 523 which correspond to quantising the LFE-to-total energy ratio vector with a 2 bit codebook, and the processing blocks 525, 527 which correspond to quantising the LFE-to-total energy ratio vector with a 3 bit codebook.

It is to be understood that each quantizing routine described in FIG. 5 can be implemented as a standalone process for quantizing the LFE-to-total energy ratios for a frame, and need to be coupled together as depicted by the processing flow of FIG. 5. In other words, this means that the low rate quantization scheme of 503 FIG. 5 can be implemented as a standalone separate routine without having to enter the vector quantization scheme according to path 502. Therefore, the sigma-delta type approach as described in context of 503 can be implemented as a standalone feature for quantizing LFE-to-total energy ratios for a frame With respect to FIG. 6 is shown an example synthesis processor 105 suitable for processing the output of the multiplexer according to some embodiments.

Figure 6:
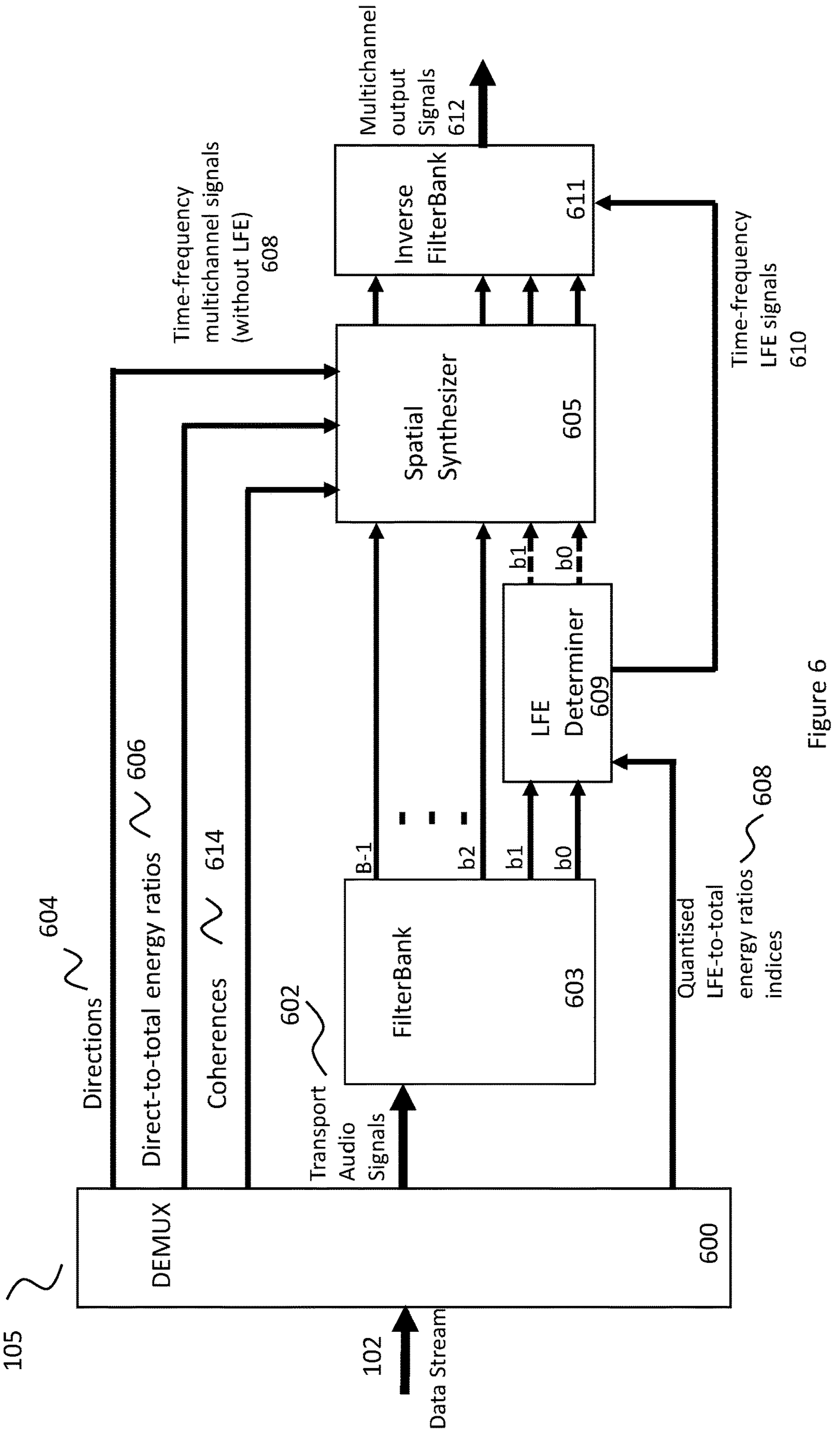
FIG. 6 shows schematically rendering apparatus suitable for implementing some embodiments.

The synthesis processor 105 as shown in FIG. 6 shows a de-multiplexer 600 The de-multiplexer 600 is configured to receive the data stream 102 and de-multiplex and/or decompression or decoding of the audio signals and/or the metadata. The directions 604, Direct-to-total energy ratios 606 and coherences 614 may also be demultiplexed from the demux 600 and passed to the spatial synthesizer 605.

The transport audio signals 602 may then be output to a filterbank 603. The filterbank 603 may be configured to perform a time-frequency transform (for example a STFT or complex QMF). The filterbank 603 is configured to have enough frequency resolution at low frequencies so that audio can be processed according to the frequency resolution of the LFE-to-total energy ratios. For example in the case of a complex QMF filterbank implementation, if the frequency resolution is not good enough (i.e., the frequency bins are too wide in frequency), the frequency bins may be further divided in low frequencies to narrower bands using cascaded filters, and the high frequencies may be correspondingly delayed. Thus, in some embodiments a hybrid QMF may implement this approach.

In some embodiments the LFE-to-total energy ratios 608 output by the de-multiplexer 601 are for two frequency bands (associated with filterbank bands $b_0$ and $b_1$). The filterbank transforms the signal so that the two (or any defined number identifying the LFE frequency range) lowest bins of the time-frequency domain transport audio signal $T_i(b, n)$ correspond to these frequency bands and are input to a LFE determiner 609.

The LFE determiner 609 may be configured to receive the (two or other defined number) lowest bins of the transport audio signal $T_i(b, n)$ and the LFE-to-total energy ratio indices. The LFE determiner 609 may then be configured to form the quantised LFE-to-total energy ratios from the LFE-to-total energy ratio indices. In embodiments this may be performed by a dequantising operation. For embodiments deploying the sigma delta approach for quantising the LFE-to-total energy ratios the LFE determiner 609 maybe arranged to receive the bit (or indication) indicating whether the value of the quantised LFE-to-total energy ratio for the current frame is formed by either increasing the previous frame quantised LFE-to-total energy or decreasing the previous frame quantised LFE-to-total energy.

In the case that the bit is received indicating that the quantised LFE-to-total energy ratio for the current frame is calculated by increasing the previous frame quantised LFE-to-total energy, in the context of the above pseudocode the signalling bit is received as a "1". The quantised LFE-to-total energy ratio for the current frame may be calculated by taking the stored quantised LFE-to-total energy ratio from the previous frame and increasing its value by the value of beta.

In the further embodiment, whereby the signalling bit for the previous frame is also taken into account during the calculation of the quantised LFE-to-total energy ratio for the current frame. In the case of the signalling bit for the previous frame also indicating a "1" (i.e. the previous frame also had an increase to the quantised LFE-to-total energy ratio). Then the quantised LFE-to-total energy ratio for the current frame may be calculated by taking the stored quantised LFE-to-total energy ratio from the previous frame and increasing its value by the by a larger value of beta*theta.

In the case that the bit is received indicating that the quantised LFE-to-total energy ratio for the current frame is calculated by decreasing the previous frame quantised LFE-to-total energy, in the context of the above pseudocode the signalling bit is received as a "0". The quantised LFE-to-total energy ratio for the current frame may be calculated by taking the stored quantised LFE-to-total energy ratio from the previous frame and damping it's value by the damping factor alpha.

The process for dequantizing the LFE-to-total energy ratio at the LSF determiner 609 for a current frame at time instant t may be expressed by the pseudocode below:

```
/ / LFE_g(t) unquantized LFE-to-total energy ratio at time instant t
/ / LFE_q(t) quantized LFE-to-total energy ratio at time instant t
/ / LFE_t LFE-to-total energy ratio (minimum active) threshold
(e.g. 0.02f)
/ / alpha time-delay-hysteris constant (e.g. 0.67f)
/ / beta pump-up gain (e.g. 0.09f)
/ / theta concecutive gain multiplier (e.g. 1.3f)
while (newframe)
  if receive ("1")
    if receiveprevious ("1")
      LFEq (t) = theta*beta + LFEq (t-1)
    else
      LFEq (t) = beta + LFEq (t-1)
  if receive ("0")
    LFEq (t) =alpha*LFEq(t-1) f;
LFEq (t-1) = LFEq (t)   //storing LFEq as previous LFEq for next time
                        instance
receiveprevious = receive //storing receive for next time instance
```

The LFE determiner may then generate the LFE channel, for example by calculating $$L(b, n) = (\Xi(b, n))^p \sum_i T_i(b, n)$$

where p is for example 0.5. In some embodiments an inverse filterbank 611 is configured to receive the multichannel loudspeaker signals from the spatial synthesizer 605 and the LFE signal time-frequency signals 610 output from the LFE determiner 609. These signals may be combined or merged them and further are converted to the time domain.

In some embodiments the transport signals may be modified before being fed to the spatial synthesizer 605. The modification may take the form for each channel i of $$T'_i(b, n) = (1-\Xi(b, n))^p T_i(b, n)$$

The resulting multichannel loudspeaker signals (e.g., 5.1) 612 may be reproduced using a loudspeaker setup.

Figure 7:
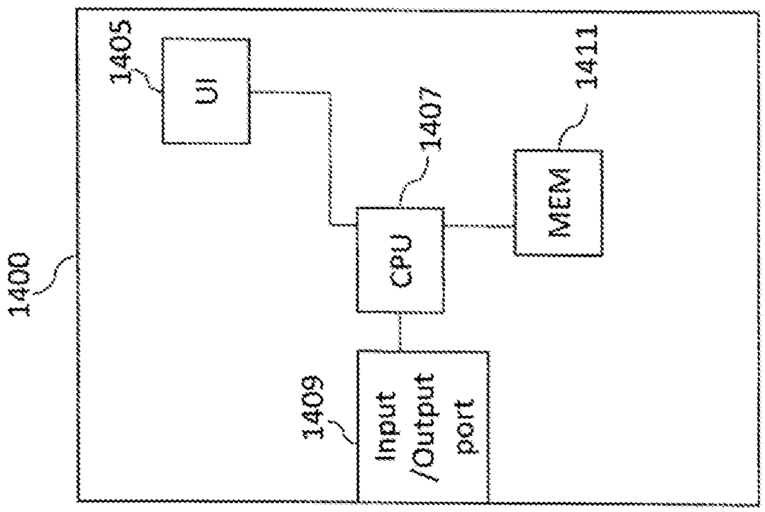
FIG. 7 shows schematically shows schematically an example device suitable for implementing the apparatus shown.

With respect to FIG. 7 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example, the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the loudspeaker signals and in some embodiments determine the parameters as described herein by using the processor 1407 executing suitable code. Furthermore, the device may generate a suitable transport signal and parameter output to be transmitted to the synthesis device.

In some embodiments the device 1400 may be employed as at least part of the synthesis device. As such the input/output port 1409 may be configured to receive the transport signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including computer program code, the at least one memory and the computer program code configured to, with the at least one processor, cause the apparatus to:
 compare an audio parameter against a threshold value and against a value dependent on a previous quantized audio parameter;
 calculate a quantized audio parameter as the previous quantized audio parameter increased by a predetermined value when the audio parameter is greater than the threshold value and greater than the value dependent on the previous quantized audio parameter; and
 calculate the quantized audio parameter as the previous quantized audio parameter multiplied by a factor value when the audio parameter is either less than the threshold value or less than the value dependent on the previous quantized audio parameter.

2. The apparatus as claimed in claim 1, wherein the apparatus is further caused to:
 encode into a bitstream an indication that the audio parameter is greater than the threshold value and greater than the value dependent on the previous quantized audio parameter; and
 encode into the bitstream an indication that the audio parameter is either less than the threshold value or less than the value dependent on the previous quantized audio parameter.

3. The apparatus as claimed in claim 1, wherein the apparatus is further caused to:
 determine that the previous quantised audio parameter has also been determined by being increased by the predetermined value; and wherein the apparatus caused to calculate the quantized audio parameter as the previous quantized audio parameter increased by the predetermined value when the audio parameter is greater than the threshold value and greater than the value dependent on the previous quantized audio parameter is caused to
 calculate the quantized audio parameter as the previous quantized audio parameter increased by the predetermined value multiplied by a gain factor when the audio parameter is greater than the threshold value and greater than the value dependent on the previous quantized audio parameter.

4. The apparatus as claimed in claim 3, wherein the gain factor has an absolute value greater than 1.

5. The apparatus as claimed in claim 1, wherein the value dependent on the previous quantized audio parameter comprises a combination of the previous quantized audio parameter increased by a predetermined value and the previous quantized audio parameter multiplied by a damping factor.

6. The apparatus as claimed in claim 5, wherein the damping factor has an absolute value less than 1.

7. The apparatus as claimed in claim 1, wherein the audio parameter is a spatial audio parameter.

8. The apparatus as claimed in claim 1, wherein the audio parameter is a low frequency effect to total energy ratio.

9. An apparatus comprising at least one processor and at least one memory including computer program code, the at least one memory and the computer program code configured to, with the at least one processor, cause the apparatus to:
 decode from a bitstream an indication;
 calculate a quantized audio parameter as a previous quantized audio parameter increased by a predetermined value when the indicator indicates that the audio parameter is greater than a threshold value and greater than a value dependent on the previous quantized audio parameter; and
 calculate the quantized audio parameter as the previous quantized audio parameter multiplied by a factor value when the indicator indicates that the audio parameter is either less than the threshold value or less than the value dependent on the previous quantized audio parameter.

10. The apparatus as claimed in claim 9, wherein the apparatus is further caused to:
 decode from the bitstream an indication relating to a previous audio parameter;
 determine that the indication relating to the previous audio parameter indicates that the quantised previous audio parameter has also been determined by being increased by the predetermined value; and
 wherein the apparatus caused to calculate the quantized audio parameter as the previous quantized audio parameter increased by the predetermined value when the audio parameter is greater than the threshold value and greater than the value dependent on the previous quantized parameter is caused to calculate the quantized audio parameter as the previous quantized audio parameter increased by the predetermined value multiplied by a gain factor when the audio parameter is greater than the threshold value and greater than the value dependent on the previous quantized audio parameter.

11. The apparatus as claimed in claim 10, wherein the gain factor has an absolute value greater than 1.

12. The apparatus as claimed in claim 9, wherein the value dependent on the previous quantized audio parameter comprises a combination of the previous quantized audio parameter increased by a predetermined value and the previous quantized audio parameter multiplied by a damping factor.

13. The apparatus as claimed in claim 12, wherein the damping factor has an absolute value less than 1.

14. The apparatus as claimed in claim 9, wherein the audio parameter is a spatial audio parameter.

15. The apparatus as claimed in claim 9, wherein the audio parameter is a low frequency effect to total energy ratio.

16. A method for encoding an audio parameter comprising:
 comparing the audio parameter against a threshold value and against a value dependent on a previous quantized audio parameter;
 calculating a quantized audio parameter as the previous quantized audio parameter increased by a predetermined value when the audio parameter is greater than the threshold value and greater than the value dependent on the previous quantized audio parameter; and
 calculating the quantized audio parameter as the previous quantized audio parameter multiplied by a factor value when the audio parameter is either less than the threshold value or less than the value dependent on the previous quantized audio parameter.

17. The method as claimed in claim 16, wherein the method further comprises:

encoding into a bitstream an indication that the audio parameter is greater than the threshold value and greater than the value dependent on the previous quantized audio parameter; and encoding into the bitstream an indication that the audio parameter is either less than the threshold value or less than the value dependent on the previous quantized audio parameter.

18. The method as claimed in claim 16, wherein the method further comprises:

determining that the previous quantised audio parameter has also been determined by being increased by the predetermined value; and wherein the calculating the quantized audio parameter as the previous quantized audio parameter increased by the predetermined value when the audio parameter is greater than the threshold value and greater than the value dependent on the previous quantized audio parameter comprises calculating the quantized audio parameter as the previous quantized audio parameter increased by the predetermined value multiplied by a gain factor when the audio parameter is greater than the threshold value and greater than the value dependent on the previous quantized audio parameter.

19. A method for decoding an audio parameter comprising:

decoding from a bitstream an indication;

calculating a quantized audio parameter as a previous quantized audio parameter increased by a predetermined value when the indicator indicates that the audio parameter is greater than a threshold value and greater than a value dependent on the previous quantized audio parameter; and calculating the quantized audio parameter as the previous quantized audio parameter multiplied by a factor value when the indicator indicates that the audio parameter is either less than the threshold value or less than the value dependent on the previous quantized audio parameter.

20. The method as claimed in claim 19, wherein the method further comprises:

decoding from the bitstream an indication relating to a previous audio parameter;

determining that the indication relating to the previous audio parameter indicates that the quantised previous audio parameter has also been determined by being increased by the predetermined value; and wherein calculating the quantized audio parameter as the previous quantized audio parameter increased by the predetermined value when the audio parameter is greater than the threshold value and greater than the value dependent on the previous quantized parameter comprises calculating the quantized audio parameter as the previous quantized audio parameter increased by the predetermined value multiplied by a gain factor when the audio parameter is greater than the threshold value and greater than the value dependent on the previous quantized audio parameter.

* * * * *